(No Model.) 10 Sheets—Sheet 1.

J. W. MEAKER.
FARE REGISTER.

No. 454,370. Patented June 16, 1891.

Witnesses:
John L. Jackson.
Robert A. Millar.

Inventor:
John W. Meaker
by Bond, Adams & Jones
attys (No Model.)  10 Sheets—Sheet 3.

J. W. MEAKER.
FARE REGISTER.

No. 454,370.  Patented June 16, 1891.

Witnesses:
John L. Jackson.
Robert A. Millar.

Inventor:
John W. Meaker
by Bond, Adams & Jones
Attys.

(No Model.)  10 Sheets—Sheet 4.
J. W. MEAKER.
FARE REGISTER.

No. 454,370. Patented June 16, 1891.

Witnesses:
John L. Jackson.
Robert A. Millar.

Inventor:
John W. Meaker
by Bond, Adams & Jones
attys (No Model.)

J. W. MEAKER.
FARE REGISTER.

No. 454,370.

Patented June 16, 1891.

Fig. 6.

Witnesses
John L. Jackson
Robert A. Millar

Inventor:
John W. Meaker
by Bond, Adams & Jones
attys (No Model.)  10 Sheets—Sheet 6.

J. W. MEAKER.
FARE REGISTER.

No. 454,370.  Patented June 16, 1891.

Witnesses:
John L. Jackson.
Robert A. Millar.

Inventor
John W. Meaker
by Bond, Adams & Jones
attys (No Model.) 10 Sheets—Sheet 7.

J. W. MEAKER.
FARE REGISTER.

No. 454,370. Patented June 16, 1891.

Witnesses:
John L. Jackson
Robert A. Millar

Inventor
John W. Meaker
by Bond, Adams & Jones
Attys

THE NORRIS PETERS CO., PHOTO-LITHO., WASHINGTON, D. C.

(No Model.)　　　　　J. W. MEAKER.　　10 Sheets—Sheet 8.
FARE REGISTER.

No. 454,370.　　　　　　　　Patented June 16, 1891.

Witnesses:
John L. Jackson.
Robert A. Millar.

Inventor:
John W. Meaker
by Bond, Adams & Jones,
attys (No Model.) 10 Sheets—Sheet 9.

J. W. MEAKER.
FARE REGISTER.

No. 454,370. Patented June 16, 1891.

Witnesses
John L. Jackson
Robert A. Millar

Inventor:
John W. Meaker
by Bond, Adams & Jones
Attys (No Model.) J. W. MEAKER. 10 Sheets—Sheet 10.
FARE REGISTER.

No. 454,370. Patented June 16, 1891.

Witnesses:
John L. Jackson
Frank S. Blanchard

Inventor:
John W. Meaker
by Bond, Adams & Jones
attys.

UNITED STATES PATENT OFFICE.

JOHN W. MEAKER, OF CHICAGO, ILLINOIS, ASSIGNOR TO THE MEAKER MANUFACTURING COMPANY, OF SAME PLACE.

FARE-REGISTER.

SPECIFICATION forming part of Letters Patent No. 454,370, dated June 16, 1891.

Application filed June 17, 1890. Serial No. 355,793. (No model.)

*To all whom it may concern:*

Be it known that I, JOHN W. MEAKER, residing in Chicago, county of Cook, and State of Illinois, and a citizen of the United States, have invented certain new and useful Improvements in Fare-Registers, of which the following is a specification, reference being had to the accompanying drawings, in which—

This invention relates to fare-registers. Many of the improvements relate particularly to the class of fare-registers shown in Letters Patent No. 397,603, dated February 12, 1889, and No. 423,436, dated March 18, 1890, granted to me, and some of the improvements relate to fare-registers generally, and are particularly designed to be used as so-called "stationary registers." The improvements relating particularly to registers of the class shown in my said former patents may be applied to either stationary or portable registers.

One object of this invention is to provide an auxiliary register which will be operated in connection with the main register, and which may be replaced by a second auxiliary register to permit the use of the main or stationary register by different conductors.

Further objects of my invention are to provide improvements in various parts of the main register, which are hereinafter more specifically set forth, and pointed out in the claims.

I accomplish these objects as illustrated in the drawings and as hereinafter set forth.

In the drawings, 2 represents the main frame of the main register. This frame is adapted to support the operative parts of the register.

3 represents the case of the register, which is secured to the frame 2 by screws or other suitable means. It is provided with the usual sight-openings for the total and trip registers, as shown in my former patents.

4 represents the attaching-plate, which is adapted to be secured to the wall of a car and to support the register-frame 2, as set forth in my former patent, No. 397,603.

5 represents the pull-strap, which I make of flexible metal bands. It is provided with eyes to which the cords or pull-straps of the car can be attached, by which the register may be operated from any part of the car.

Figure 1:
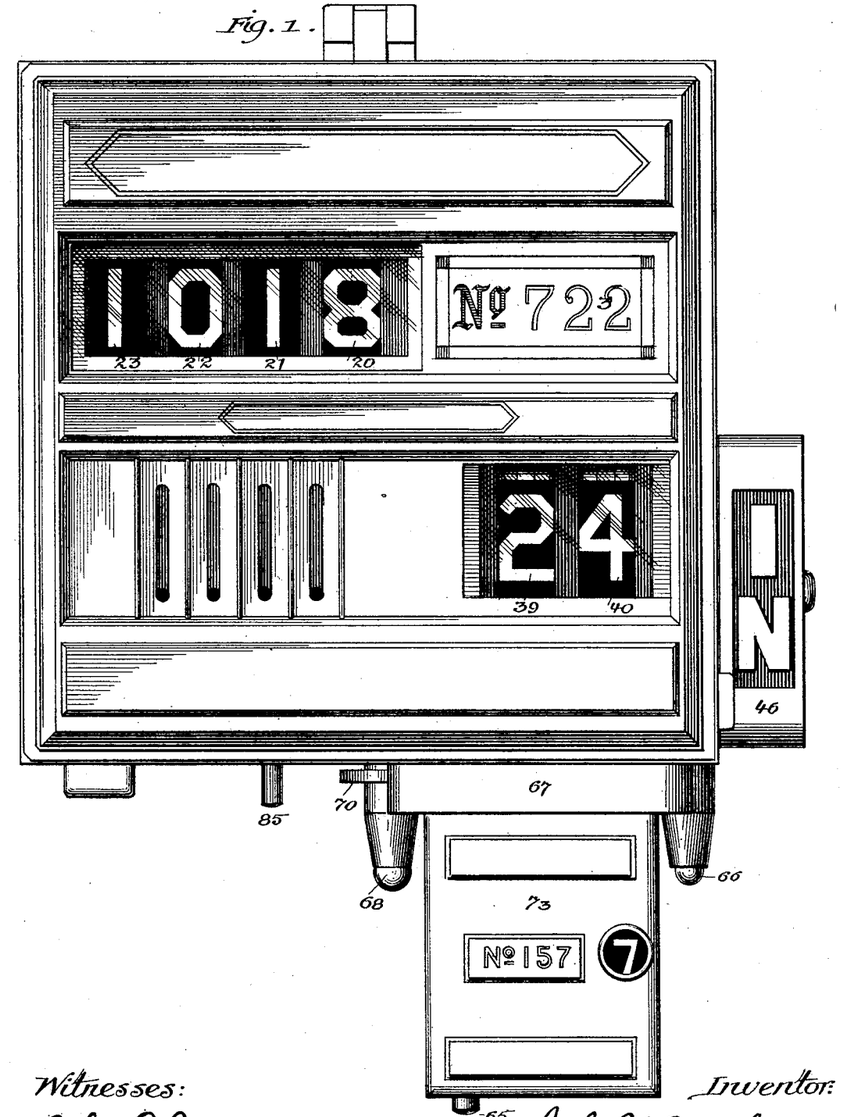
Figure 1 is a front elevation.
Figures 2, 22:
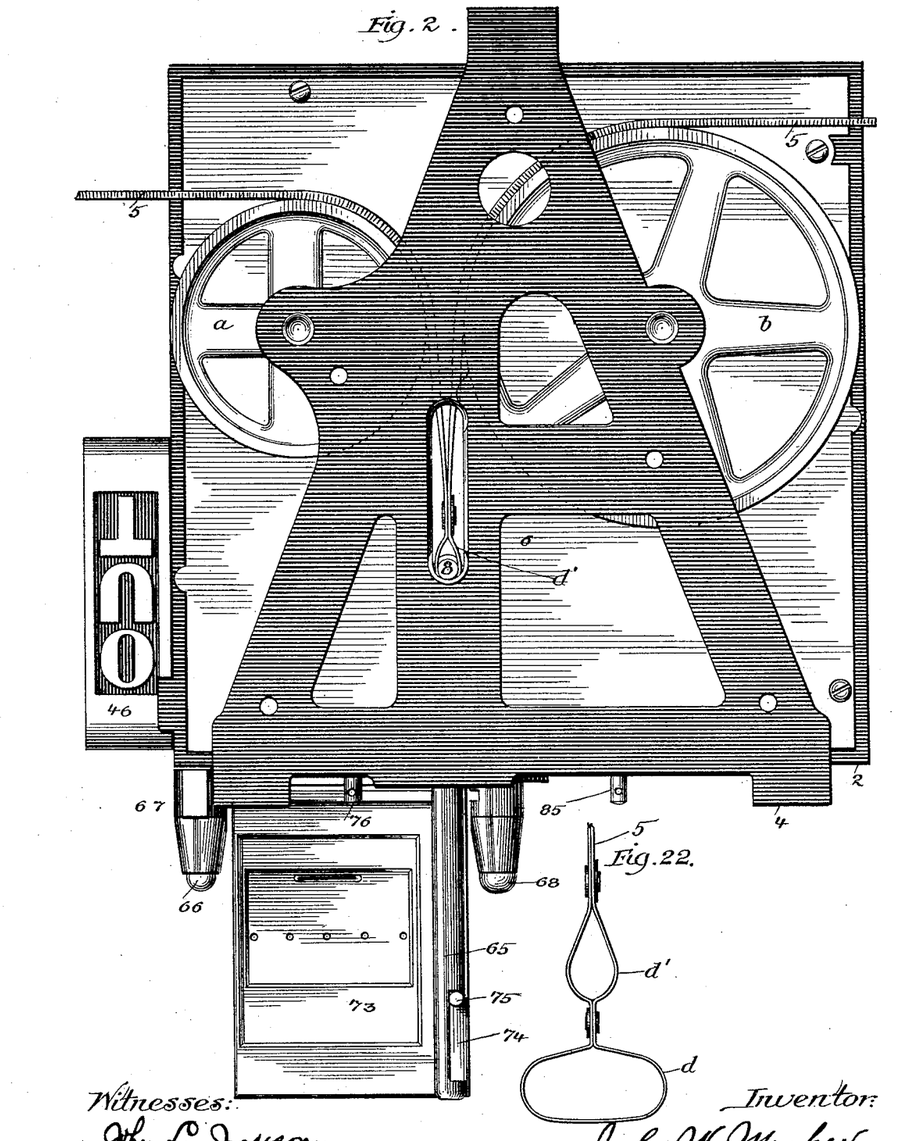
Fig. 2 is a rear elevation.
Fig. 22, Sheet 2, is a detail showing the guiding portion of the pull-strap.

Upon the attaching-plate 4 are mounted two wheels *a* and *b*, between which the straps 5 pass. The strain of the straps 5 will be principally taken up by the wheels *a* and *b* so that no side strain or any unusual motion given to the pull-cords will be communicated to the register itself. The plate 4 is provided with a bar *c*, which passes over the space between the wheels *a b*, and the strap 5 is provided with a widened portion *d*, which slides between the plate 4 and bar *c*, thereby guiding the strap 5 and preventing it from being twisted. The strap 5 is provided with an eye *d'*, adapted to receive a pin 8, which is secured upon the main pull-bar 7, as best shown in Fig. 2. The bar *c* is provided with a slot *e*, through which the pin 8 passes. The ends of the slot *e* form stops for the pin 8. The limit-stops for the strap 5 are, therefore, on the supporting-plate rather than on the register, so that the strain from an overpull on the strap 5 is taken by the attaching-plate and not by the register, and injury to the register from such cause is prevented.

6 represents the back plate, which consists of a sheet of metal and is secured to the frame 2 by screws or other suitable means.

Figure 3:
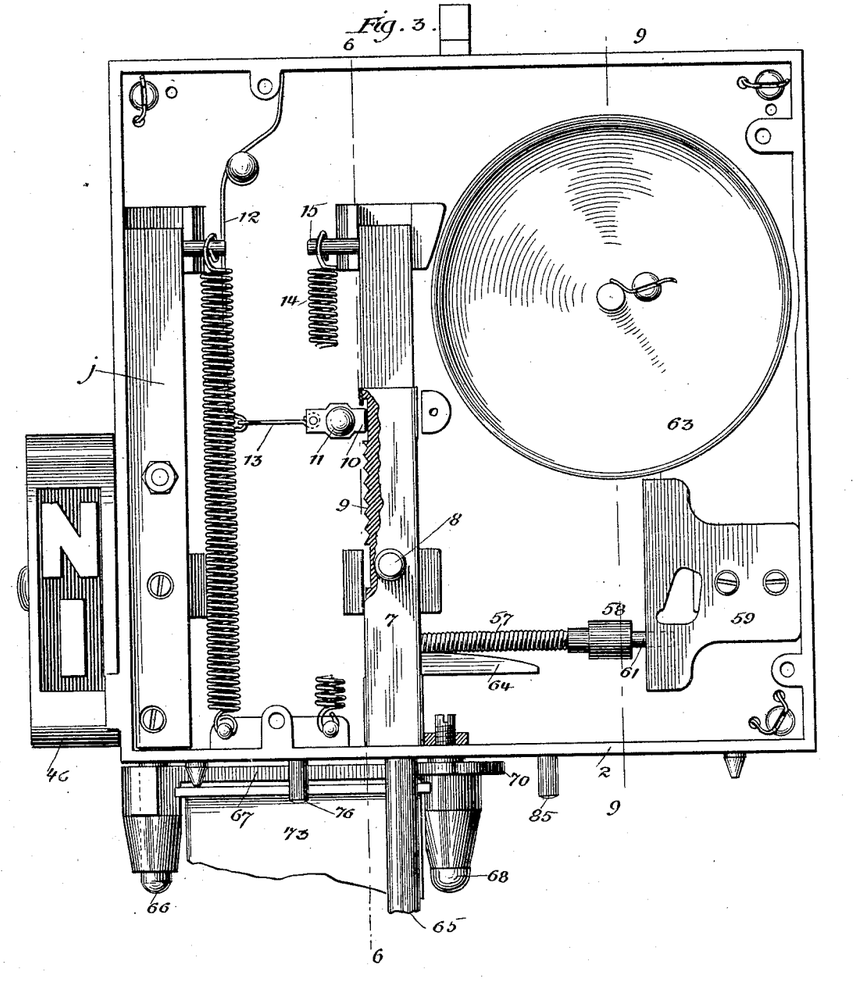
Fig. 3 is a rear elevation, the attaching plate and the back being removed.
Figure 6:
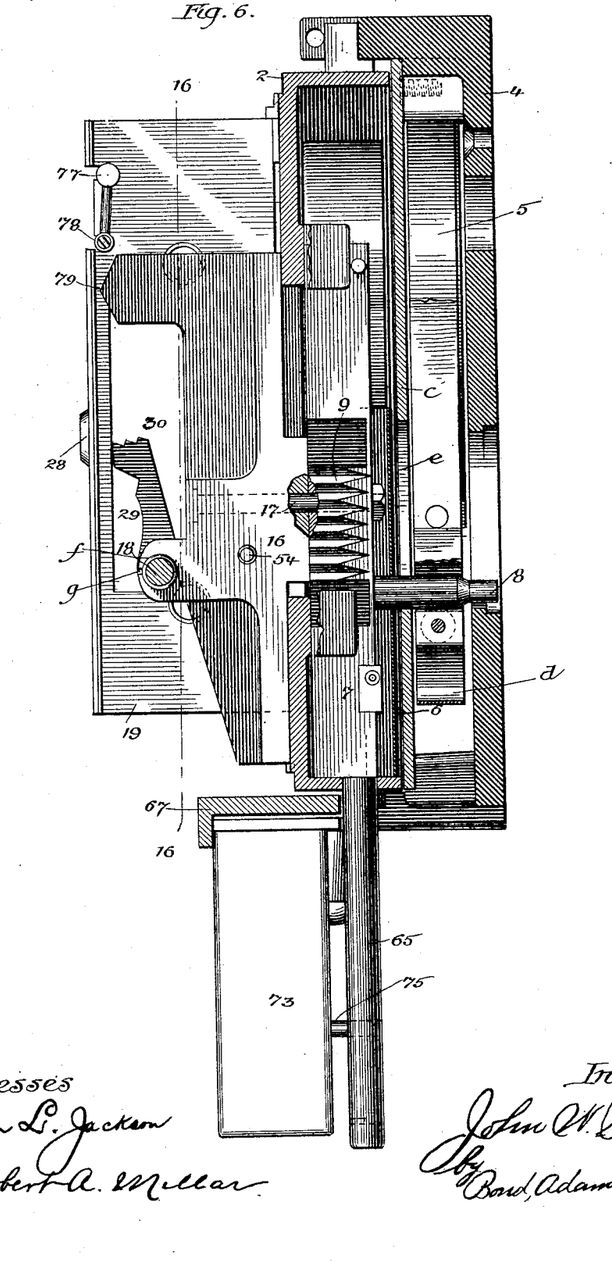
Fig. 6 is a longitudinal section on line 6 6 of Fig. 3.

The pull-bar 7 is provided with a series of teeth 9 on one side, as shown in Figs. 3 and 6, with which teeth a pawl 10, provided with two angular edges and pivoted upon a pin 11 in proper position, will engage when the pull-bar 7 is actuated. A spring 12 is connected with the outer end of the pawl 10 by a link 13 to hold the pawl in proper position to engage with the ratchet-teeth 9 when the pull-bar 7 is moved in either direction. The pull-bar 7 is returned to its normal position after each stroke by a spring 14, attached at one end to the frame 2 and at its opposite end to a pin or projection 15 of the pull-bar 7.

The operation of this device is similar to that set forth in my former patent, No. 423,436, and is for the purpose of compelling a complete stroke of the pull-bar 7 in each direction.

16 represents the main pull-slide, which is located on the front side of the main frame 2, and is secured to the main pull-bar 7 by means of a bolt 17, which passes through a slot in the frame 2. By the use of a pull-bar 7 on the back of the frame 2 and the slide 16 on the front of the frame rigidly connected with the pull-bar the frame 2, between the bar and slide, forms a perfect guide for the slide. Upon the slide 16 is mounted a rod 18, which projects on both sides of the slides and carries the pawls for operating the total and trip registers. The rod 18 is secured in a hole *f* in the slide 16. The slide 16 in front of the hole *f* is provided with two cuts *g* and *h*, and the rod 18 is provided with a pin *i'*. The rod 18 is inserted in the hole by first wedging open slightly the cut *g*, inserting the pin through the cut *g*, and turning it into the cut *h*. The wedge is then removed from the cut *g* and the metal of the slide clamps the rod 18, preventing its withdrawal. This construction furnishes a ready means of securing the rod in place, and the rod is held in position with great firmness.

19 represents the chain-frame for the chains of the total-register. This frame may be constructed in the form shown in my former patent, No. 423,436. Upon this frame are mounted the units-chain 20, tens-chain 21, hundreds-chain 22, and thousands-chain 23. Each chain, as usual, consists of ten links hinged together upon hinge-pins *i*. The units-chain 20, tens-chain 21, and hundreds-chain 22 are each provided with a link, preferably the zero-link having a recess 24. The units-chain 20 is provided with a projection 25 on each link, except the link having the recess 24. Each link of the tens, hundreds, and thousands chains, except the link of each chain having the recess 24, is provided with a shallow recess or notch 26. Each link of the chains 20, 21, 22, and 23 is provided with a numeral-bearing mask 27, which is hinged to the links of the chains upon the hinge-pins *i*. This gives a smooth numeral-bearing surface for the several links, and also leaves a space between the mask and link. The mask 27 of the zero-links of the units and tens chains may be provided with an extension 28, which permits the actuating-pawl to drop in the recess 24, as hereinafter set forth.

Figure 15:
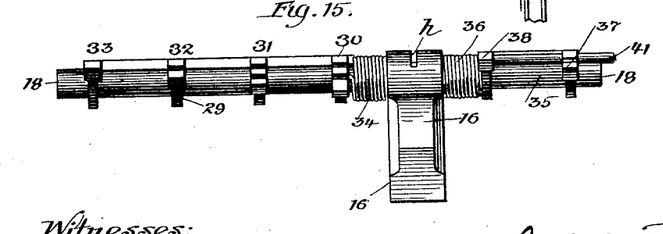
Fig. 15 is a detail, being a top or plan view of the main pull-slide, the actuating-pawl, and its supporting-rod.

29 is the actuating-pawl for the total-register, which is mounted upon the rod 18, as shown in Fig. 15. This pawl 29 is provided with an engaging lug 30, adapted to engage with the units-chain 20, an engaging lug 31, adapted to engage with the tens-chain 21, an engaging lug 32, adapted to engage with the hundreds-chain 22, and an engaging lug 33, adapted to engage with the thousands-chain 23. As shown in Fig. 6, the forward edges of the lugs on the pawl 29 engage with the chains, and, as shown in Fig. 15, the lug 30 projects forward of the lug 31, the lug 31 projects forward of lug 32, and the lug 32 projects forward of the lug 33, so that the lug 31 can only engage with the tens-chain when the recess 24 in the units-chain is brought opposite the lug 30, when a spring 34, hereinafter described, will throw the lug 30 far enough into the recess 24 for the lug 31 to engage the tens-chain. Likewise the lugs 30 and 31 normally keep the lug 32 out of engagement with the hundreds-chain until both lugs 30 and 31 engage openings 24 in their respective chains, and likewise the lugs for operating chains of the higher orders are kept out of engagement with their respective chains, except when recesses 24 are brought opposite all the lugs for operating the chains of the lower orders. A spring 34 is mounted upon the rod 18 and attached at one end to the slide 16 and at the other to the pawl 29. When the slide 16 is pulled, the spring 34 will cause the lug 30 to engage with a projection 25 on the units-chain and move the chain the length of one link. When the lug 30 engages with the zero-link of the link having the recess 24 of the units-chain 20, it will enter the recess 24, permitting the lug 31 to enter a notch 26 of one of the links of the tens-chain 21, moving the tens-chain one link, and thereby carrying the tens from the units. When the lugs 30 and 31 both enter recesses 24 in their respective chains 20 and 21, the lug 32 will enter a notch 26 in one of the links of the hundreds-chain 22 and move the hundreds-chain one link, thereby carrying hundreds. The pawl 29 therefore actuates the units-chain one link each registration, the tens-chain one link each ten registrations, the hundreds-chain one link each hundred registrations, and the thousands-chain one link each thousand registrations. The last chain, which in this instance is the thousands-chain 23, is not provided with a recess 24, but each of its links is provided with a notch 26. The spring 34 causes the pawl 29 to engage with the chains at all times.

In my former patent, No. 423,436, I showed and described the units-chain having a notch in one link and a pawl adapted to engage with both the units and tens chain. In the device above described the pawl 29 is provided with a series of lugs adapted to engage with a series of chains, whereby a single pawl actuates the entire series of chains forming the register. The engaging edges of the lugs on the pawl 29 are preferably notched, as shown, to provide a more perfect contact. If desired, however, the engaging edges of the lugs on the pawl 29 may be smooth and rounded.

On the trip-register side of the slide 16 a pawl 35 is mounted upon the rod 18, and a spring 36 is attached to the pawl 35 and slide 16 for holding the pawl 35 in engagement with the trip-register chains. The pawl 35 is provided with a lug 37, adapted to engage with the units-chain 40 of the trip-register, and a lug 38, adapted to engage with the tens-chain 39 of the trip-register.

Figure 16:
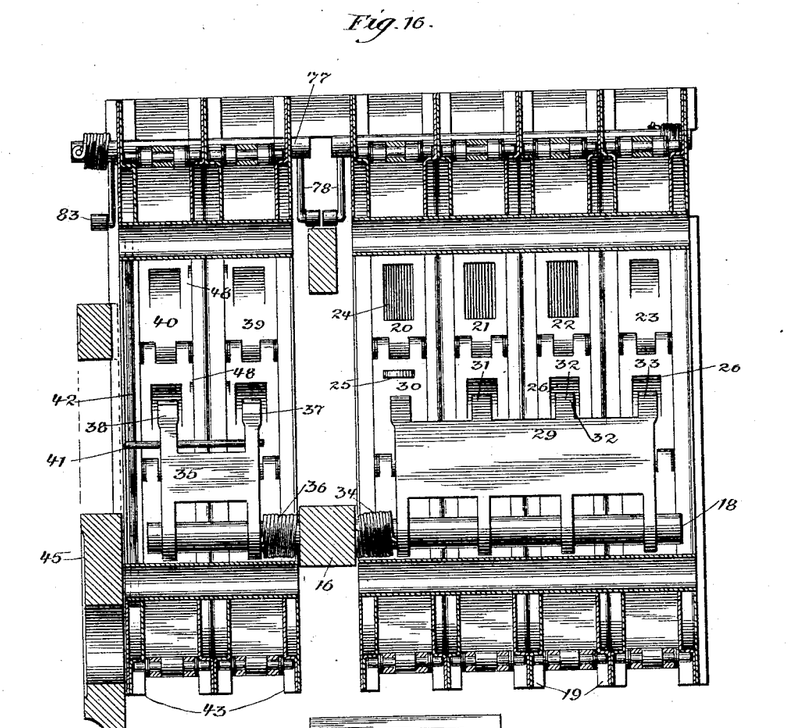
Fig. 16 is a cross-section on line 16 16 of Fig. 6, looking forward, the cover being removed.

The operation of the pawl 35 and trip-register chains 39 and 40 is the same as that described in my former patent, No. 423,436. The trip-register pawl 35 is provided with a pin 41. A rod 42 is pivoted at one end to the trip-register-chain frame 43 and bent at 44 for the purposes hereinafter described. The pin 41 engages with the back side of this rod 42, as hereinafter set forth, and as shown in Fig. 16.

Figures 25, 26:
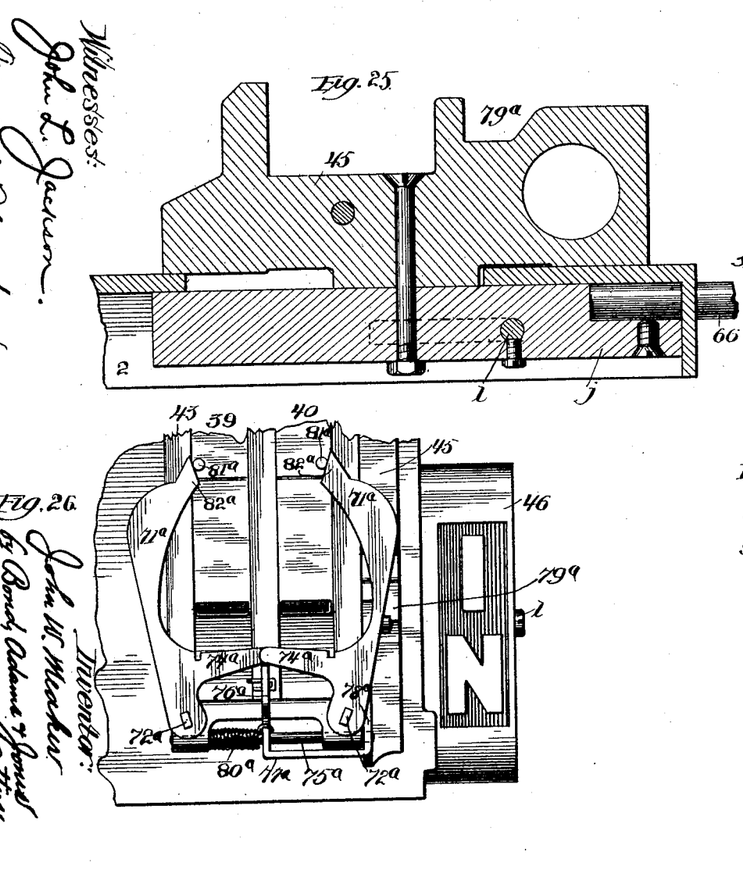
Fig. 25 is a longitudinal section through the resetting slide and bar.
Fig. 26 is a detail, being a front elevation of the canceling device.

45 is the resetting-slide, which is arranged to operate in substantially the same manner as the slide in my former patent, No. 397,603, and is secured to a bar j by a pin or bolt, as shown in Fig. 25, which bar j corresponds to the bar 7 of the main pull-slide. To the bar j is attached the usual actuating-handle 46, the frame 2 being provided with a slot indicated by dotted lines in Fig. 25, in which the attaching-pin l of the handle 46 slides. The ends of this slot form stops for the pin and handle, so that any strain or jerk which may be given to the handle will be stopped by the frame, thereby preventing injury to the resetting mechanism.

By bolting together the slide 45 and the bar j upon opposite sides of the main frame 2, as shown in Fig. 25, a perfect bearing is formed for the resetting-slide 45.

The slide 45 is provided with a pin 49, (see Fig. 7,) adapted to engage with the bend 44 in the rod and swing it backwardly whenever the slide 45 is moved for the purpose of resetting the trip-chains to zero and the swinging of the rod 42 will cause it to engage with the pin 41 upon the pawl 35 and thereby move the pawl 35 out of engagement with the trip-register chains 39 and 40.

Figure 24:
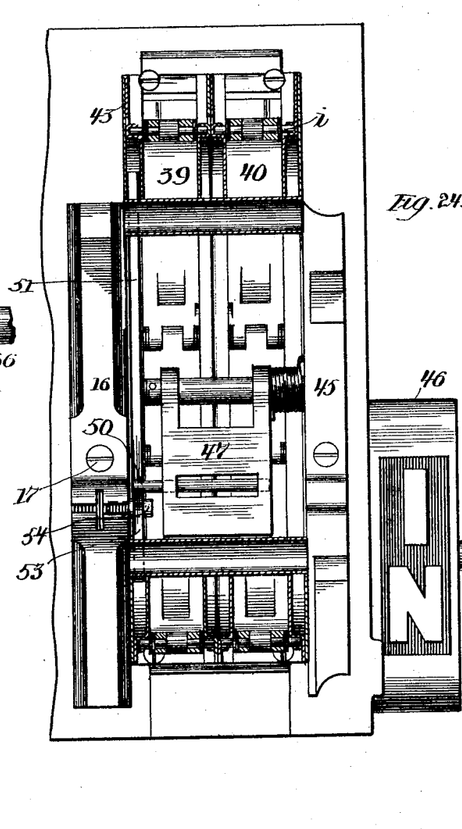
Fig. 24 is a detail, being a cross-section through the trip-register-chain frame looking toward the rear, the main pull-slide and the resetting-slide being in front elevation.

The resetting-pawl 47 is provided on one side with a pin 50, and a rod 51 is pivoted at one end, as at 52, in the trip-register frame 43. This rod passes beneath the pin 50 on the pawl 47 and is bent as at 53. The main pull-slide 16 is provided with a pin 54, (see Figs. 6 and 24,) which is back of the bend 53 in the rod 51. When the main pull-slide 16 is actuated for the purpose of registering, the pin 54 will engage with the bend 53 in the rod 51, thereby raising the rod 51 and lifting the pawl 47 out of engagement with the trip-register chains.

The devices above described for holding the resetting-pawl out of engagement when the actuating slide and pawl has been moved from normal position, and the devices for holding the actuating-pawl out of engagement when the resetting-pawl has moved from its normal position prevent the raising of the chain-stops, hereinafter set forth, by one pull, and then throwing of the chain the length of more than one link by pulling with great or sudden force on the other slide. The resetting-pawl is also held out of engagement while a registration is being made, thereby preventing dragging of the resetting-slide upon the chains and the consequent friction that should arise from such dragging. The use of these devices also prevents breaking of the operative parts by the engagement of the stop, hereinafter described, with the chains by the operation of one slide and then attempting to operate the chains with the other slide. These devices also prevent the operator from partly actuating the trip-register chains by the pawl 35 and completing the movement by the resetting-pawl 47.

Figure 7:
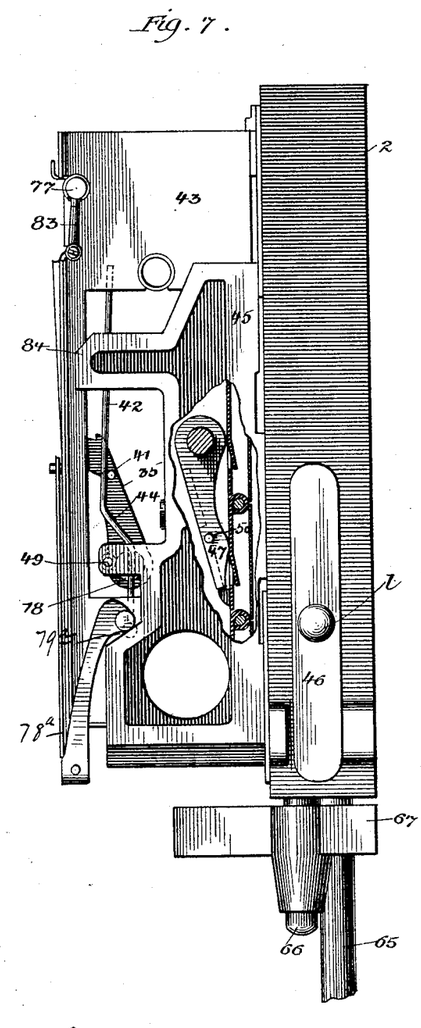
Fig. 7 is a side elevation of the trip-register side, the case being removed.
Figure 8:
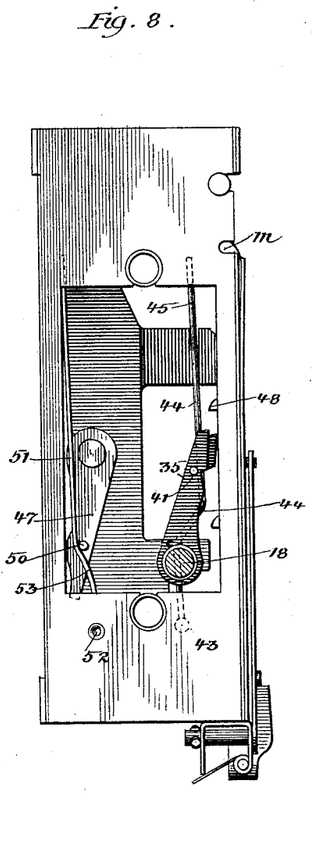
Fig. 8 is an elevation of the inner side of the trip-register frame.

The trip-register is provided with a canceling device which is like that fully shown and described in my patent, No. 397,603; but I do not limit my invention to the canceling device shown. The cancelers $71^a$ are each secured on a rock-shaft $72^a$, mounted in a frame secured to the trip-register-chain frame 43. These shafts $72^a$ at their inner ends are connected by a coiled spring, (not shown herein, but clearly shown in my former patent,) which acts to turn the rock-shafts $72^a$ inward and throw the cancelers $71^a$ across the trip-chains 39 and 40. The cancelers $71^a$ have arms $74^a$, which project inward, the arms 74ª of the cancelers for the units-chain being extended laterally, so as to pass over that of the tens-chain. When the cancelers are in their normal position, as shown in Fig. 26, they are held against being thrown across the chains 39 and 40 by means of the projecting arms 74ª, which are held by a movable stop 76ª, Fig. 26, which is pivoted upon a bar 75ª, secured in the chain-frame 43 and pressed down by a coiled spring 80ª, as best shown in Fig. 26. The lower end of the arm or stop 76ª is secured to or made integral with a cross-bar 77ª, which projects beyond the chain-frame 43 and has secured to it an arm 78ª, (see Fig. 7,) the end of which rests in a notch 79ª on the resetting-slide 45, when the parts are in their normal position, as shown in Figs. 7 and 26. At the end of a trip when it is desired to reset the trip-chains to zero, the chains are advanced by the resetting-slide 45, as heretofore. The first movement of the slide 45 raises the end of the arm 78ª out of the notch 79ª, which rocks the bar 77ª and raises the stop-arm 76ª and thereby releases the cancelers 71ª, which are thrown across the trip-register chains by their spring, the projecting arms 74ª passing under the stop-arm 76ª. The trip-chain links which have on their faces the digit 9, in use are the ones that have a pin 81ª near their lower ends to engage with the cam ends 82ª of the cancelers 71ª, as shown in Fig. 26. When the chains are reset to zero, the pins 81ª engage with the cam ends 82ª and move the cancelers back out of sight and the arms 74 forward, allowing the stop-arm 76 to drop behind them, thus holding the cancelers in their retracted position, as shown in Fig. 26, until again released, as before described.

The particular mechanism employed to operate the canceling device and the particular form of canceling device shown are considered preferable, because they permit the use of a resetting mechanism which can be thrown out of contact with the trip-register chains during the period of registration. The essential feature, however, is that a signal be shown which will compel the operator to return the trip-register to zero.

The additional importance of the canceling or signaling devices, in connection with the trip-register, will appear hereinafter when the use of the auxiliary register is explained.

Figure 17:
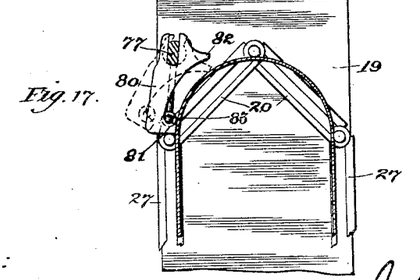
Fig. 17 is a detail showing the stop or lock for the chains.

Both the total and the trip registers are provided with stop devices for the chains. This stop device for each of said registers consists of a shaft 77, (see Figs. 16 and 17,) which shaft is provided with a spring, as usual, and with an arm 78, adapted to be engaged by a cam 79 on the main pull-slide 16, as shown in Fig. 6. On each shaft 77 is secured a number of rocking pawls 80, one for each register-chain. Each pawl 80 has an extension 81, adapted to engage with a hinge-pin of the chain-links when the shaft 77 and arm 78 are in their normal position, as shown in Fig. 17, and with a heel 82, adapted to engage with the hinge-pin of the chain when the extension 81 is lifted out of the engaging position. When the slide 16 is actuated for the purpose of registering, the cam 79 will lift the arm 78, thereby rocking the shaft 77 and raising the extension or engaging end 81 of the pawl 80 from engaging contact with the hinge-pin $i$. The hinge-pin $i$ cannot pass the heel 82 until it is lifted. The heel 82 will be lifted simultaneously with the descent of the extension 81, and the descent of the extension 81 will prevent the passage of a second hinge-pin, so that a chain cannot be moved more than the length of a single link. When the slide 16 is actuated as above described the chain will be free to move forward, and at the same time the heel 82 will swing toward the path of the hinge-pin $i$. Thus the pawl 80 in effect plays the part of an escapement.

The shaft 77 for the trip-register is provided with a second arm 83, adapted to be engaged by a cam 84 on the trip-register-resetting slide 45, as shown in Fig. 7. The operation is the same as that already described for the registering mechanism.

In order to prevent the chains of both the total and trip registers from being moved backwardly, I provide a spring-latch 55 for each chain, each of which spring-latches 55 is soldered or secured to the front of the chain-frame at a considerable distance from the top, and at its top end is provided with a notch 56, adapted to receive the hinge-pins $i$ of the respective chains of the registers and prevent the backward movement of the chains upon the chain-frame.

Heretofore difficulty has been experienced, due to the engagement of the hinge-pins $i$ with the edges of the openings in the chain-frame, through which they are inserted into position, as such pins are loose and can therefore slide longitudinally. To overcome this objection, I provide the following construction: Both chain-frames 19 and 43 are provided with notches $m$ opposite the ends 81 of the pawls 80, through which the hinge-pin $i$ can be inserted to join the chain-links together. By locating these holes $m$ at the point shown and above mentioned the pins $i$ are prevented from catching at the holes by the latches 55 and pawls 80 during the operation of the machine. By this construction the pins $i$ are prevented from rising longitudinally to a point opposite the holes $m$ when the machine is in operation, so that they cannot slide longitudinally into such holes and thereby catch.

Figures 9, 10, 11, 12, 13, 14:
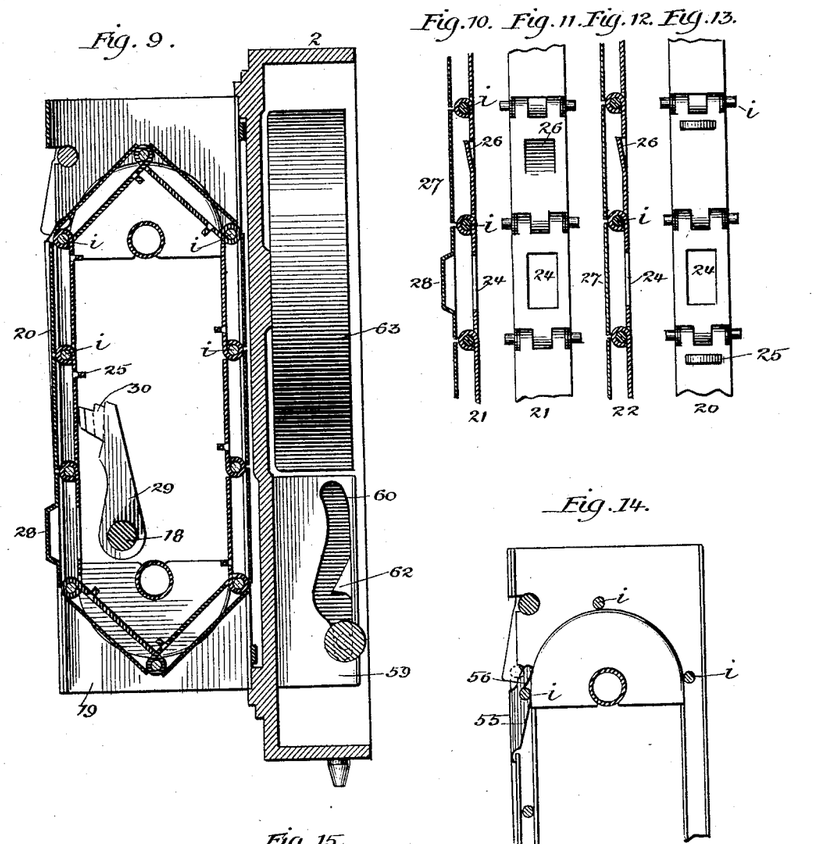
Fig. 9 is a longitudinal section on line 9 9 of Fig. 3.
Fig. 10 is a detail, being a longitudinal section through several links of the tens-chain of the total-register.
Fig. 11 is a detail, being an inside view of several links of the tens-chain of the total-register.
Fig. 12 is a detail, being a longitudinal section through several links of the hundreds-chain of the total-register.
Fig. 13 is a detail, being an inside view of several links of the units-chain of the total-register.
Fig. 14 is a detail showing the catch for the chain-links.
Figure 23:
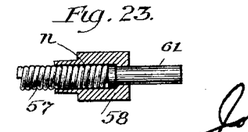
Fig. 23, Sheet 3, is a detail, being a section through the bell-hammer.

My improved alarm mechanism is constructed as follows: A stiff coiled spring 57 is at one end secured firmly in the main pull-bar 7, or in a block secured therein, and at its free end is provided with a bell-hammer 58. The bell-hammer 58 is provided with a longitudinal hole $n$, which is countersunk part way of its length. A steel pin 61 is inserted into this hole $n$, its head resting against the countersink, as shown in Fig. 23. The end of the spring 57 is then inserted in the hole $n$ and the hammer pinched on the spring, thereby securing the spring firmly in the hammer. A plate 59 is secured upon the frame 2 and is provided with a slot 60 on one side adapted to receive the pin 61 on the bell-hammer. A lip or flange 62 on the plate 59 is arranged to engage with the pin 61 and a bell 63 is secured upon the main frame 2 near the end of the slot 60, as best shown in Fig. 3. The spring 57 is given an upward tendency or spring action, so that the pin 61 will press against the upper edge of the slot 60 and, as shown in Fig. 9, the slot 60 at the end near the bell 63 is provided with a downward curve.

An arm 64 is secured to the pull-bar 7 in rear of the spring 57, for purposes hereinafter set forth. When the pull-bar 7 is actuated for a registration, the end of the spring 57 connected therewith will be carried with it, while the pin 61 will engage with the lip 62, retarding the hammer 58 until the pull-bar is moved to near the completion of its stroke, when the pin 61 will slip by the lip 62 and the hammer 58 will strike the bell 63. When the spring 57 is bent back by the engagement of the pin 61 with the lip 62, it will engage with the arm 64, which will insure the disengagement of the pin 61 from the lip 62 at the proper time, and will relieve the spring at its attaching points from a large amount of the strain. The engagement of the steel pin 61 with the edge of the slot 60 is sufficient to prevent the hammer 58 from striking the bell 63 more than once on a single registration, the downward curve of the slot 60 near the bell 63 preventing the hammer when vibrating after a stroke from touching the bell, as has been found in practice.

In order to protect the employer and simplify the system of keeping accounts, as hereinafter set forth, I provide a removable or auxiliary register, which is supported upon the primary or main register and is actuated simultaneously therewith.

In order to avoid confusion of terms I will hereinafter term the primary or main register, which consists of the total and trip registers, the "main register," and the removable or auxiliary register, hereinafter described, the "auxiliary register." The term "total-register" I apply to the total-registering mechanism of the main register, and the term "trip-register" to the registering mechanism of the main register which registers the fares collected by a conductor on a trip and is reset to zero to commence a second trip.

The pull-bar 7 is provided with a rod or extension 65, which extends through the main frame 2, as best shown in Fig. 6. The resetting-bar $j$ of the trip-register is provided with a similar rod or extension 66, which also extends through the main frame 2. The rod 65 may, in some cases, be connected with other parts of the actuating mechanism of the main register although it is preferable to attach it to the pull-bar 7, and the rod 66 may be attached to other parts of the resetting mechanism of the trip-register, although it is preferable to attach it to the resetting-bar $j$.

Figure 4:
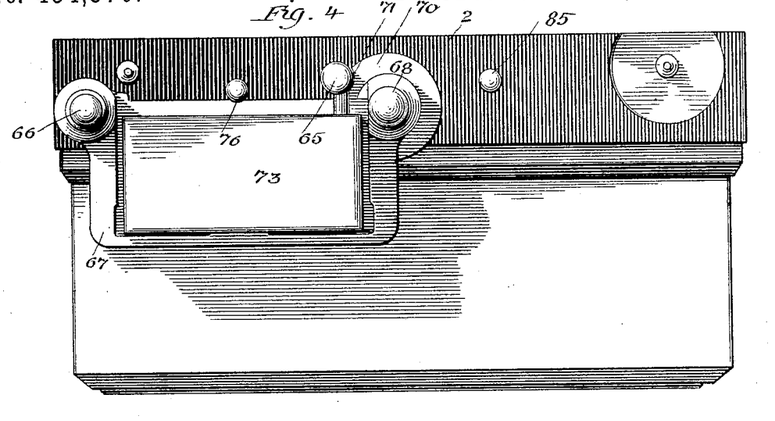
Fig. 4 is an under side view.
Figure 5:
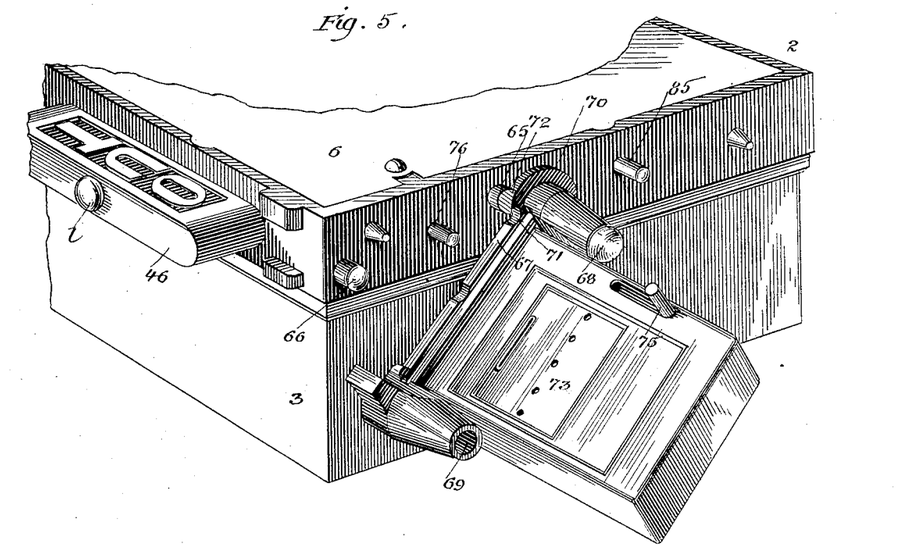
Fig. 5 is a perspective view, the pull-bar being broken off, showing the auxiliary register in position to be removed.

A plate 67 is hinged upon a bolt 68, secured in the main frame 2, and is provided with a tubular recess 69, adapted to receive the rod 66 of the resetting mechanism when it is in its normal position, as best shown in Fig. 3. The plate 67 around the pin 68 is provided with a circular hub 70, as best shown in Fig. 4. This hub 70 is provided with a notch 71, adapted to receive the actuating rod 65 when the plate 67 is in its normal position. The main pull-rod 65 is provided with a notch 72, which, when the main pull-bar 7 is in its normal position will be in position to receive the circular hub 70 when the plate is moved from its normal position. The plate 67 is adapted to support a removable auxiliary register 73. This auxiliary register may be any suitable kind of register, preferably one of the class shown in my former patents, but need not be provided with a trip-registering mechanism.

The main pull-rod 65 is provided with an elongated notch or slot 74, adapted to receive a pin 75, or other part of the pull-bar or actuating bar of the auxiliary register 73. The slot 74 is elongated to permit the rod 65 to move a greater distance than the pin or projection 75, as the primary register is larger than the auxiliary register, and its actuating devices must move through a greater distance.

The frame 2 is provided with a pin or projection 76, which prevents the removal of the auxiliary register 73, while the plate 67 is in its normal position. The frame 2 is also provided with a pin 85, which forms a stop with which the plate 67 engages when turned on its pivot-bolt 68, for the purpose of removing the register 73.

Whenever a registration is made on the main register the rod 65 will actuate the auxiliary register so that the auxiliary register will show as many registrations as the main register. The resetting pull-rod 66 enters the tubular recess 69 and holds the plate 67 in its normal position. When the plate 67 is in its normal position, the registering mechanisms of the main register may be operated as usual. When the plate 67 is out of its normal position, the registering mechanisms of the main register cannot be operated, as hereinafter more specifically set forth.

When it is desired to remove the auxiliary register 73 from the plate 67, the resetting-slide must be moved for the purpose of withdrawing the rod 66 from the recess 69. This will cause the cancelers to be thrown across the trip-register chains the same as when the resetting-slide is moved for the purpose of resetting the chains, thereby compelling the conductor to reset the trip-register chains to zero before he can remove the cancelers from the trip-register chains.

When the plate 67 is in its normal position, the main pull-rod 65 will slide in the notch 71 in the hub 70; but when the plate 67 is turned on its pivot-bolt 68 the circular part of the hub 70 will enter the notch 72 in the rod 65, thereby preventing the rod 65 from being moved until the plate 67 is returned to its normal position, so that a registration cannot be made on the primary register when the plate 67 is not in its normal position. The hub 70 can enter the recess 72 in the rod 65 only when the main pull-bar 7 and rod 65 are in their normal position, so that the auxiliary register can only be removed when the actuating devices of the main register are in their normal position.

The auxiliary register is particularly designed to be used in connection with a main register which is secured in some part of a car or vehicle. Each conductor is to be provided with an auxiliary register. One conductor can place his auxiliary register in proper position on the main register of his car and the fares collected will be simultaneously registered upon the main and auxiliary registers. If the conductor is transferred to another car, he can take his auxiliary register and use it in connection with the main register of the second car and the auxiliary register will then show the number of fares collected by the conductor upon both cars. If a second conductor takes a car after the first conductor leaves it, the auxiliary registers of the two conductors will show the number of fares collected by each, and the main register, which is stationary in the car, will show the number of fares collected on that car by both conductors. The above-described registers, therefore, permit the transfer of a conductor from one car to another and the employment of different conductors upon the same car without the necessity of employing a special accountant to take account of the number of fares collected at the times of the transfers.

The use of the auxiliary register in connection with the main register simplifies the reports and the books of account of the conductors and employés of the employer. A conductor upon taking a car must place upon his trip-sheet the number shown at the sight-opening of the total-register of the main register on his car. He must make report at the end of each trip the number of fares collected upon each trip, and at the end of his last trip upon the car he must place upon his trip-sheet the number shown at the sight-opening of the total register of the main register. The sum of his trip-register reports must be equal to the difference between the two readings of the main register. When another car is assigned to him, he must make similar reports upon his trip-sheets. When he accounts to the auditor of the employer, he settles according to his reports of the trip-register and the sums of the difference between the first and last readings of the various main or stationary registers which he has used. The sum of the trip-register reports and the sum of the differences in readings of the main register must balance. When he reports, he hands in at the same time his auxiliary register, from which the auditor reads the number shown at the sight-opening. The difference between the number shown by the auxiliary register at this time from that shown at the previous reading must balance with the amount reported by the conductor to the auditor, because the registrations on the auxiliary register have been simultaneous with the registrations upon the various main registers employed. The first reading by the second conductor of the total-register of the main register must be the same as the last reading of the previous conductor, so that the auditor always has a check upon the conductors or persons reporting the readings. By this system a fraudulent manipulation of reports is prevented, and the conductors can be changed from one car to another, using the main registers of the several cars without any confusion and with perfect accuracy.

When an auxiliary register of one conductor is removed from a main register, the cancelers will be thrown across the sight-opening of the trip-register, thereby showing a signal until the trip-register is returned to zero. This will compel the second conductor to return the trip-register to zero before beginning to register, so that the trip-register of the second conductor must start from zero, and thereby show the number of fares collected by the second conductor, preventing any confusion with fares collected by the first conductor.

The actuating mechanism of the main register must be returned to normal position before the auxiliary register can be removed from its supporting-plate, thereby preventing any confusion which might arise from the removal of the auxiliary register while the actuating mechanism is not in normal position.

The actuating mechanism cannot be operated while the supporting-plate for the auxiliary register is out of its normal position, so that no confusion can arise, as might otherwise be the case were the registering mechanism capable of being actuated during the period of changing the auxiliary registers, and so that a conductor cannot place his auxiliary register in apparent proper position, but actually not in working position in connection with the main register.

Figure 18:
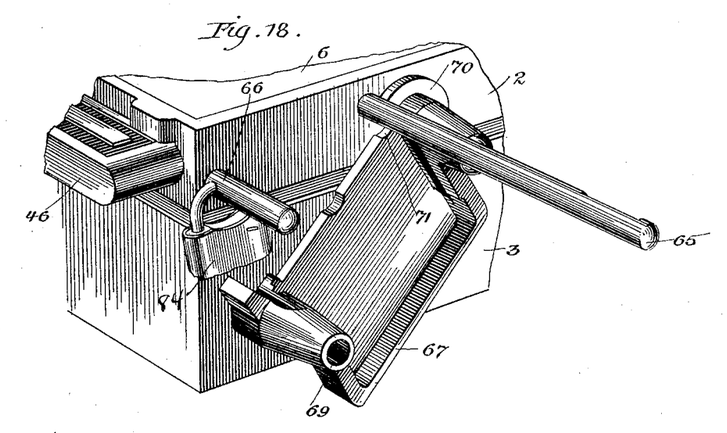
Fig. 18 is a perspective view of the parts shown, showing the registering mechanism locked.
Figure 19:
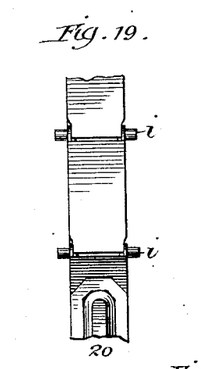
Fig. 19 is a detail, being a front elevation of several links of the units-chain of the total-register.
Figure 20:
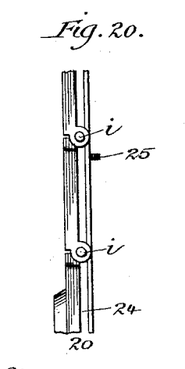
Fig. 20 is a detail, being a side view of several links of the units-chain of the total-register, showing the manner of attaching the mask.
Figure 21:
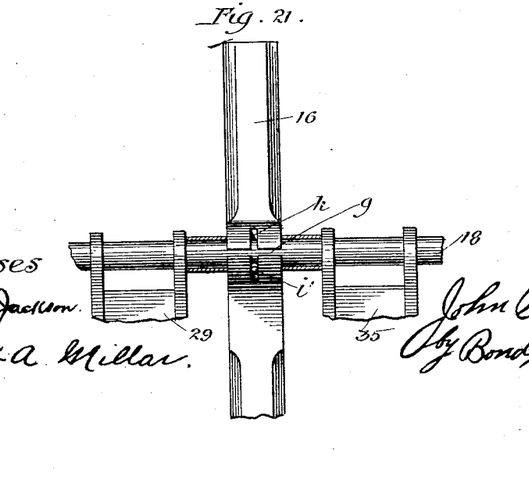
Fig. 21 is a detail, being a top view of a portion of the pull-bar.

As shown in Fig. 18, the rod or extension 66 is provided with a hole adapted to receive the hasp of a padlock 84. This padlock can be applied when the plate 67 is turned on its pivot for the purpose of removing the auxiliary register 73. When the padlock 84 is applied, it prevents the plate 67 from being returned to its normal position, and as the registering mechanism of the main register is held inoperative while the plate 67 is out of its normal position, the padlock 84 therefore prevents the operation of the main register when it is applied as above described.

Having described my main and auxiliary registers, and the construction set forth in the drawings and the system for which it is adapted, I wish it to be understood that the same is only one of different mechanisms which I have contemplated and which may be effectually employed for carrying out the main feature of my invention, which is an auxiliary register which operates simultaneously with the main register, to which it is applied and which is capable of being removed and replaced.

It will be understood that various forms of registering mechanisms may be employed for the auxiliary register, and that various forms of canceling or signaling devices may be employed for the trip-register of the main register.

The construction which I have shown and fully described is one which I have actually employed and found to be perfect in operation.

What I claim as new, and desire to secure by Letters Patent, is—

1. In a fare-register, the combination, with a series of registering-chains, each chain being composed of links and one link of each chain being provided with a recess, of an actuating mechanism comprising a pawl provided with a series of engaging lugs adapted to engage with the series of chains, each chain being engaged by a single lug and each lug projecting forward farther than the lug of the next higher order, substantially as and for the purpose specified.

2. In a fare-register, the combination, with trip-register chains and trip-register pawl 35, of a rod 42, adapted to engage with the pawl 35, and the resetting-slide 45, having a pin 49 thereon, whereby the pawl 35 is held out of engagement with the chains while the chains are being reset by the resetting-slide, substantially as specified.

3. In a fare-register, the combination, with trip-register chains and a resetting-pawl 47, of a rod 51, adapted to engage with the pawl, and the main pull-slide having a pin 54 thereon, whereby the resetting-pawl is held out of engagement during the period of registration, substantially as specified.

4. In a fare-register, the combination, with trip-register chains and resetting mechanism therefor, of a pawl actuating the trip-register chains and held from engagement therewith while the resetting mechanism is being operated, substantially as described.

5. In a fare-register, the combination, with trip-register chains and an actuating pawl and slide, of a resetting-pawl serving to reset the trip-register chains and hold them out of contact with such chains during the period of registration, substantially as described.

6. In a fare-register, the combination, with trip and total registering mechanisms composed of chains and stops for engaging with the chain-pivots, of actuating mechanism for the trip and total register comprising a slide, resetting mechanism for the trip-register comprising a slide, devices for raising the said stops, and devices for preventing the operation of the parts connected with one of said slides when the stops have been raised by the other slide, whereby jumping of the chains is prevented, substantially as specified.

7. A registering-chain for a fare-register composed of links adapted to be engaged by an actuating-pawl, and masks 27 hinged to the links on the chain-pivots, substantially as and for the purpose specified.

8. In a fare-register, the combination, with a sliding pull-bar, a coiled spring 57 secured at one end in said pull-bar, and a hammer 58 on the outer end of said coiled spring, of a projection 62, adapted to be engaged by said hammer, and a bell 63, arranged to be struck by said hammer, substantially as specified.

9. In a fare-register, the combination, with a sliding pull-bar, a coiled spring attached at one end to said pull-bar, a hammer 58 on the other end of said spring, and an arm 64, secured to said pull-bar beneath said coiled spring, of a projection 62, adapted to be engaged by said bell-hammer, and a bell 63, arranged to be struck by said hammer, substantially as specified.

10. In a fare-register, the combination, with the bell, a projection 62, and a sliding pull-bar 7, of a coiled spring 57, secured at one end to said pull-bar, a hammer provided with a longitudinal hole and adapted to be secured upon said spring, and a steel pin having a head adapted to be secured in the longitudinal hole of the hammer, substantially as specified.

11. In a fare register, the combination, with a spring bell-hammer 58 and pin 61, of a plate 59, a slot 60 therein, adapted to receive the pin 61 and provided with a forward curve near the bell, and a lip 62, substantially as and for the purpose specified.

12. In a fare-register, the combination, with a pull-bar having a series of ratchet-teeth, and a pivoted pawl 10, adapted to engage with the ratchet-teeth, of a link 13, attached to the pawl, and a spring 12, connected to the link and acting thereupon to hold the pawl in proper position for engaging the ratchet-teeth in either direction of movement of the pull-bar, substantially as described.

13. In a fare-register, the combination, with registering-chains and hinge-pins $i$, of a chain-frame provided with holes $m$, and spring-latches 55, arranged to engage the pins $i$ back of the holes $m$, whereby the pins are prevented from catching at the holes in operation, substantially as specified.

14. In a fare-register, the combination of a rod 18 with a slide 16, having a hole adapted to receive the rod and provided with two cuts $g$ and $h$, and a pin on said rod, substantially as and for the purpose specified.

15. The combination, with a register-frame, of an attaching-plate adapted to be secured to the wall of a car, wheels mounted upon said attaching-plate, a pull-strap, and a connection between the pull-strap and registering mechanism, substantially as specified.

16. In a fare-register, the combination, with the frame of a register and registering mechanism, of an attaching-plate 4, a bar $c$, provided with a slot $e$, and a pin 8, connected with the registering mechanism, whereby the registering mechanism is relieved of all strain, substantially as and for the purpose specified.

17. The combination, with a register-frame and registering mechanism, of an attaching-plate, wheels thereon, and a flexible metal pull-strap, substantially as and for the purpose specified.

18. The combination, with a register-frame and registering mechanism, of an attaching-plate, a bar $c$, wheels on the said attaching-plate, and a flexible metal pull-strap provided with a widened portion $d$ for guiding the strap, substantially as specified.

19. In a fare-register, the combination, with a main stationary register comprising total and trip registering chains, of a detachable auxiliary register, and pull-bar mechanism for operating the auxiliary register simultaneously with the main register, substantially as specified.

20. In a fare-register, the combination, with a stationary register comprising total and trip registering chains, of an auxiliary register, devices for removably suspending the auxiliary register from the stationary register, and pull-bar mechanism for actuating the auxiliary register simultaneously with the stationary register, substantially as and for the purpose specified.

21. In a fare-register, the combination, with the main register and an extended actuating-bar 65, provided with an elongated slot 74, of an auxiliary register provided with a pin or projection 75 connected with its registering mechanism, whereby the register-actuating mechanism of the main register may have a longer movement than the actuating mechanism of the auxiliary register, substantially as specified.

22. In a fare-register, the combination, with a total-register, the trip-register, actuating mechanism, and resetting mechanism for the trip-register, of an auxiliary register, mechanism for operating the auxiliary register from the actuating mechanism of the main register, and devices connected with the resetting mechanism for locking the auxiliary register in position, substantially as specified.

23. In a fare-register, the combination, with a total-register, a trip-register, actuating mechanism, resetting mechanism for the trip-register, and canceling devices operated by the resetting mechanism, of an auxiliary register, mechanism for operating the auxiliary register from the actuating mechanism of the main register, and devices connected with the resetting mechanism for locking the auxiliary register in position, substantially as specified.

24. In a fare-register, the combination of the frame and actuating mechanism of a main register, with an auxiliary register, a plate adapted to support the auxiliary register and hinged to the main register-frame, and devices for preventing the operation of the main register when the plate of the auxiliary register is moved from its normal position, substantially as specified.

25. In a fare-register, the combination, with a frame 2 and an actuating-bar 65, provided with a notch 72, of a plate 67, hinged to the frame 2, provided with a circular hub 70, and an auxiliary register supported on said plate 67 and operated by said bar 65, substantially as specified.

26. In a fare-register, the combination, with a main register and its actuating mechanism, of a detachable auxiliary general register locked against removal when the actuating mechanism is out of its normal position, substantially as described.

27. The combination, with a main register, of a removable and replaceable general auxiliary register, which during the period of being detached operates to lock the main register and when entirely removed leaves the main register in operative condition for registration, substantially as described.

28. In a fare-register, the combination, with the frame 2 and actuating-bar 65, of a plate 67, provided with a notch 71 and hinged to the frame 2, and an auxiliary register supported upon said plate, substantially as and for the purpose specified.

29. In a fare-register, the combination, with a stationary main register comprising a trip-register, of a detachable auxiliary register, devices for operating the auxiliary register simultaneously with the stationary main register, and a canceling device adapted to be thrown across the trip-register when the detachable auxiliary register is removed, substantially as specified.

30. In a fare-register, the combination, with registering-chains having projecting hinge-pivots, of a pawl having an extension 81 and heel 82, a shaft 77, and devices for operating the pawl from the actuating-slide, substantially as specified.

31. In a fare-register, the combination, with a total-registering mechanism and a resetting mechanism, of devices for attaching an auxiliary register and a lock for preventing a registration while the auxiliary register is removed, substantially as specified.

32. The combination, with a frame 2 and total and trip registering mechanism, of a plate 67, hub 70, guiding-bar 65, provided with a notch 72, bar 66, and a padlock 84, substantially as specified.

JOHN W. MEAKER.

Witnesses:
HARRY T. JONES,
JOHN L. JACKSON.